United States Patent
Tran et al.

(10) Patent No.: US 11,629,097 B2
(45) Date of Patent: Apr. 18, 2023

(54) METHOD FOR PRODUCING CONSTRUCTION AGGREGATE FROM FLY ASH AND THE AGGREGATE OBTAINED WITH THIS METHOD

(71) Applicant: Nghia Trung Tran, Ho Chi Minh (VN)

(72) Inventors: Nghia Trung Tran, Ho Chi Minh (VN); Hau Trung Tran, Ho Chi Minh (VN); Khang Duy Vu Huynh, Ho Chi Minh (VN)

( * ) Notice: Subject to any disclaimer, the term of this patent is extended or adjusted under 35 U.S.C. 154(b) by 976 days.

(21) Appl. No.: 16/377,153

(22) Filed: Apr. 5, 2019

(65) Prior Publication Data
US 2019/0337848 A1 Nov. 7, 2019

(51) Int. Cl.
| | |
|---|---|
| *C04B 18/02* | (2006.01) |
| *C04B 18/08* | (2006.01) |
| *C04B 22/06* | (2006.01) |
| *C04B 40/02* | (2006.01) |
| *C04B 28/00* | (2006.01) |
| *C04B 14/22* | (2006.01) |

(52) U.S. Cl.
CPC ............ *C04B 18/021* (2013.01); *C04B 14/22* (2013.01); *C04B 18/088* (2013.01); *C04B 22/062* (2013.01); *C04B 28/006* (2013.01); *C04B 40/024* (2013.01); *C04B 40/0218* (2013.01); *C04B 40/0263* (2013.01)

(58) Field of Classification Search
CPC ....... C04B 12/005; C04B 12/04; C04B 14/22; C04B 18/021; C04B 18/08; C04B 18/088; C04B 22/062; C04B 28/006; C04B 40/024; C04B 40/0213; C04B 40/0218; C04B 40/0222; C04B 40/0259; C04B 40/0263; Y02P 40/10; Y02W 30/91
See application file for complete search history.

(56) References Cited

U.S. PATENT DOCUMENTS 8,709,150 B2 * 4/2014 Nayak .................... C04B 14/10
106/707

FOREIGN PATENT DOCUMENTS

| AU | 2007200076 A1 * | 7/2008 |
|---|---|---|
| CN | 104829206 A * | 8/2015 |

* cited by examiner

*Primary Examiner* — Anthony J Green
(74) *Attorney, Agent, or Firm* — BN IP-Consulting LLC; Binh-An Nguyen

(57) ABSTRACT

The present invention relates to method for producing construction aggregate, comprising the steps of:
 (i) preparing materials, which comprises (% by weight): fly ash (80 to 99.75%); alkaline activator (0.25 to 20%); water (6 to 30% of total weight of fly ash and alkaline activator);
 (ii) mixing the alkaline activator with all the aforementioned water amount to create alkaline activator solution, after which will be mixed with fly ash to create geopolymer mortar;
 (iii) molding the geopolymer mortar with the compressive force of 2 MPa and more with desired dimension, wherein the molding is carried out with hydraulic pressing, extrusion, rolling or tablet lamination.
 (iv) solidifying; and
 (v) optionally, crushing the construction aggregate obtained above to a predefined dimension.
Besides, the present invention relates to the construction aggregate from fly ash obtained by the above mentioned method.

15 Claims, No Drawings

METHOD FOR PRODUCING CONSTRUCTION AGGREGATE FROM FLY ASH AND THE AGGREGATE OBTAINED WITH THIS METHOD

FIELD OF THE PRESENT INVENTION

The present invention relates to method for producing construction aggregate such as artificial sand, stone from fly ash; and the artificial sand and stone obtained thereby with this method. Products obtained with this method hardly exhaust $CO_2$ to the air.

BACKGROUND OF THE PRESENT INVENTION

Currently, the wastes of fly ash are usually disposed by dumping, causing severe environmental pollutions and scattering dust into the air as well as costing land space for dumping.

On the other hand, construction materials such as sand and stone are increasingly scarce because they are non-renewable natural resources. Meanwhile, the needs for construction and construction material production are increased according to population growth.

Due to super-smoothness and lightness of the fly ash, its application in construction is still limited.

The method for producing fly ash beads as well as surface treatment with spray-dry method to create fly ash beads with fine powder characteristics, which can be used as a replacement for building sand, have already been known. This artificial sand from fly ash has low module and hardness, which is only suitable to be used as building sand in some certain situations. This artificial sand cannot be used as material in common use.

Therefore, a replacement for natural sand and stone with the existing source of fly ash, which can meet the technical demands set for high-quality building sand and stone, is needed.

SUMMARY OF THE PRESENT INVENTION

A basis object of the present invention is to propose a method for producing aggregate from fly ash and artificial sand, stone obtained thereby with this method.

The inventor accidentally found that blending fly ash with alkaline activator helps improve density and dimension of fly ash in order that it can be suitably used as construction material; additionally found that the geo-polymerization process can be accelerated by increasing compressive force simultaneously with increasing temperature of the polymerization process to obtain the initial hardness, which is sufficient to create products with hardness eligible for transportation in processes of production and inventory. Based on the aforementioned discoveries, the invention was completed.

Specifically, the present invention proposes:

[1]. Method for producing construction aggregate from fly ash comprises the steps of:
(i) preparing materials, which comprises (% by weight): fly ash (80 to 99.75%); alkaline activator (0.25 to 20%); water (6 to 30% of total weight of fly ash and alkaline activator);
(ii) mixing the alkaline activator with all the aforementioned water amount to create alkaline activator solution, after which will be mixed with fly ash to create geopolymer mortar;
(iii) molding the geopolymer mortar with the compressive force of 2 MPa and more with desired dimension, wherein the molding is carried out with hydraulic pressing, extrusion, rolling or tablet lamination.
(iv) solidifying by:
optionally, steam curing up to 100° C. or autoclaving;
drying at the temperature of 60 to 250° C.; to obtain construction aggregate from fly ash; and
(v) optionally, crushing the construction aggregate obtained above to a predefined dimension.

[2]. The method for producing construction aggregate from fly ash according to section 1, wherein the alkaline activator is selected from the group comprising: sodium hydroxide, potassium hydroxide, potassium silicate, sodium silicate, molten glass, calcium hydroxide or mixture of them.

[3]. The method for producing construction aggregate from fly ash according to section 1 or 2, wherein the solidification in step (iv) is carried out by:
steam curing up to 100° C.; and
drying at the temperature of 60 to 250° C.;

[4]. The method for producing construction aggregate from fly ash according to any one of sections [1] to [3], wherein the drying is carried out by infrared cure oven, resistance oven or microwave oven.

[5]. The method for producing construction aggregate from fly ash according to any one of sections [1] to [4], wherein the alkaline activator is mixed from sodium hydroxide and molten glass, of which mass fraction of sodium hydroxide and molten glass (dry weight based) ranges from $10/1$ to $1/10$.

[6]. The construction aggregate from fly ash obtained from the method according to any above section.

DESCRIPTION OF THE PREFERRED EMBODIMENTS

Critical constituents in geopolymerization reactions are fly ash, which plays the role of pozzolan, and alkaline activator.

Fly ash in the present invention is fly ash from thermal power plant or incineration house, which can be either type F or type C, which mostly contains silicon oxide, calcium oxide, aluminum oxide, iron oxide and carbon and can be considered a type of pozzolan. In the role of pozzolan, a certain amount of fly ash can be replaced by other source of pozzolan, such as volcanic cinder, bottom ash but as a less preferred embodiment.

The alkaline activator in the present invention comprises alkaline activators broadly known in the geopolymer area. Specifically, the alkaline activator is selected from the group comprising: sodium hydroxide, potassium hydroxide, potassium silicate, sodium silicate, molten glass, calcium hydroxide or mixture of them. Molten glass is the aqueous solution of $Na_2O \cdot nSiO_2$ or $K_2O \cdot mSiO_2$, or mixture of them, wherein n and m are silicate module available in the market, which can be used as independent alkaline activator or mixed with other alkali by any proportion. Usually the alkaline activators are used in solid form, after which they are dissolved in a predefined water amount to become a solution, which are eventually mixed with other constituents. However, the alkaline activator can be mixed with other powder, such as fly ash, then mixed with a predefined water amount to keep the production going. Due to high price of NaOH and KOH, meanwhile molten glass is cheaper, it would be best if the alkaline activator is mixture of NaOH or KOH with molten glass, of which mass fraction of NaOH or KOH and molten glass (dry weight based) ranges from $10/1$ to $1/10$.

In a preferred embodiment of the present invention, the invention proposes a method for producing construction aggregate from geopolymer material, comprising the steps of:

(i) preparing materials, which comprises (% by weight): fly ash (80 to 99.75%); alkaline activator (0.25 to 20%); water (6 to 30% of total weight of fly ash and alkaline activator);

(ii) mixing the alkaline activator with all the aforementioned water amount to create alkaline activator solution, after which will be mixed with fly ash to create geopolymer mortar;

(iii) molding the geopolymer mortar with the compressive force of 2 MPa and more with desired dimension, wherein the molding is carried out with hydraulic pressing, extrusion, rolling or tablet lamination.

(iv) solidifying by:
optionally, steam curing up to 100° C. or autoclaving;
drying at the temperature of 60 to 250° C.; to obtain construction aggregate from fly ash; and (v) optionally, crushing the construction aggregate obtained above to a predefined dimension.

In steps (i) and (ii), if the alkaline activator is in solid form, it can be mixed with the predefined water amount prepared in step (i) to create a solution, which later is mixed with fly ash to become semi-dry or dense solution. In another way, the alkaline activator is dry-mixed with fly ash, after which is mixed with water. If the alkaline activator is in the form of aqueous solution, the water amount in this solution must be taken into account of the predefined water amount, in order that the total amount of water remains the same and it will not make the fly ash block too fluid to be pressed or extruded. Method and mixing device facilitate mixing up fly ash with alkaline activator have been broadly known in this technical area.

The total amount of water ranges from 6 to 30%, better at 8 to 15% or even better at 10%, of total weight of alkaline activator and fly ash. The water amount exceeding 30% of the total weight is not preferred because it can make the fly ash block too pasty to be extruded after the mixing. Water amount less than the proposed amount might not be sufficient to percolate all fly ash beads, leading to unequal mixing.

The amount of alkaline activator must be sufficient for geopolymerization process, i.e. equal to at least 0.25% of the total weight of fly ash and alkaline activator. Use of the alkaline activator in exceed might lead to waste due to high price of the substances. Therefore, alkaline activator amount should not exceed 20% of the total weight, better at 1 to 8% of the total weight or even better at 4 to 6% of the total weight.

In the molding method to create the raw product block, the mold and anti-sticking surface treatment inside the mold are carried out in conventional way. The shape of the product block after forming are preferred with simple sections such as circle, square or rectangle. It is best to employ double action press method, i.e., top-down and bottom-up pressing. The minimum compressive force is 2 MPa to accelerate the engagement of the mixture, thanks to which the product block can be released from the mold after the pressing process without having to wait for the binding process. Higher compressive forces are preferred, such as 5 or 10 or 15 MPa, compressive forces up to 30 MPa or even higher can all be employed. Compressive forces less than 2 MPa are not preferred because with that force, the product is not tightly pressed, leading to possibility of cracking after being released from the mold. With compressive forces of more than 2 MPa, after reaching the desired compressive force it is possible to release the mold to perform the next pressing cycle, thereby declining production cycle and increasing productivity. Compressive forces exceeding 20 MPa or 30 MPa are usually not preferred due to the high risk of breaking the mold, decreasing product life expectancy, leading to other risks and costs.

In the extrusion method to create the raw product, the screw extrusion method is employed with common techniques to create constant long product with section similar to the extrusion mold section, dimension of extrusion mold depends on the extruder capacity, simple sections such as circle, square or rectangle are preferred; number of molding holes depends on the extruder capacity. A non-preferred method is piston-based interrupted extrusion, pressing the materials via extrusion mold or combining extrusion with pressing based on common principles.

In a less preferred embodiment of the present invention, geopolymer mortar needs no forming and it can be directly solidified into a hard block and then crushed to create artificial sand and stone.

The aim of solidification is to enhance geopolymerization process thoroughly and completely, thanks to which the product after the solidification can obtain the necessary hardness, shortening the production cycle. The solidification is carried out by: optionally, steam curing up to 100° C. or autoclaving; drying at the temperature of 60 to 250° C. The drying process, as mentioned above, helps the product obtain the initial hardness which meets the demands of input materials for crushing machine, such as initial hardness of 2 MPa to 60 MPa or more.

In a preferred embodiment of the present invention, the drying process is carried out by resistance rings providing heat for cylinder and extrusion molding head at an adjusted temperature up to 250° C., depending on dimension of the product block. In this embodiment, the steam curing process is skipped.

In another preferred embodiment of the present invention, the drying process is carried out by infrared cure oven, resistance oven, solar power oven, or microwave oven. It is best to use microwave oven to shorten drying time, increase drying efficiency, and transfer heat. Using microwave oven, drying process only takes several minutes to less than 30 minutes, depending on dimension of the product block.

The drying time depends on product dimension, as long as the product core reaches the predefined temperature. The calculations of drying time, drying capacity, oven dimension are all common knowledge, which can be easily proposed by people with average knowledge in this area, and needs no re-description.

In another preferred embodiment of the present invention, before drying for product solidification, the product optionally goes through steam curing at the temperature of 100° C. from half an hour to several hours, or autoclaved, depending on the product dimension, with the aim of equally absorbing alkaline activators and additives into fly ash or aggregate, thereby increasing product hardness.

The product block after solidification will be put into common sand or stone crushing machine to be crushed to desired dimension and put into use.

In another preferred embodiment of the present invention, the feed mixture might comprise other constituents, combined with fly ash before putting into forming process. The mixture constituents include known constituents in the area of construction materials production, and not limited to the following constituents: inorganic binders such as cement, calcium hydroxide, zeolite, bentonite, plaster, CaO, MgO;

organic binders; additives such as plasticizers, waterproof compounds, coloring agents, intensity boosting additives, etc.

Depending on dimension of the products made with the aforementioned method, they can be considered construction stones or strain-hardening aggregate. If they are crushed, they will be crushed to the desired dimension to be replacement for building sand and stone.

The aggregate obtained from the method of the present invention has great hardness, pressing strength of 2 MPa and more, and module similar to common building sand and stone. Thereby, they are suitable to be replacement for building sand and stone. The proportion of fly ash and alkaline activator to aggregate and other feed mixture constituent depends on the purpose of use of the artificial sand and stone; to obtain desired strength and meet other technical requirements.

EXAMPLES OF THE PRESENT INVENTION

Example 1: Production of Artificial Sand

The materials are as follows:
Fly ash collected from Vinh Tan 2 thermal power plant: 990 kg
NaOH solid flakes: 10 kg
Water: 100 kg Carry out the process in steps from (i) to (ii) of the aforementioned method to create geopolymer mortar. Specifically, mix NaOH with water to create alkaline solution which will then be mixed with fly ash. Eventually, we have 1100 kg of geopolymer mortar containing fly ash and NaOH.

Create cylinder-shaped beads with diameter of 5 mm and length of 5 mm by use of extruder with compressive force of 2 MPa, drying by microwave oven in 3 minutes until the temperature at the bead center reaches 200° C. Release the products and put them into the crushing machine until the beads can go through 2.5 mm holes to be used as artificial sand, which is the same quality as raw coarse sand used for high performance concrete. This method can produce 1000 kg of artificial sand.

Example 2: Production of Artificial Sand Using Mixed Alkaline Activators

The materials are as follows:
Fly ash collected from Vinh Tan 2 thermal power plant: 905 kg
NaOH solid flakes: 60 kg
Molten glass 45%: 78 kg (equal to 35 kg of solid)
Water: 57 kg The procedure is carried out as described in Example 1, which can produce 1000 kg of artificial sand.

Example 3: Production of Artificial Sand and Stone with Molding Method

The materials are as follows:
Fly ash collected from Vinh Tan 2 thermal power plant: 905 kg
NaOH solid flakes: 60 kg
Molten glass 45%: 78 kg (equal to 35 kg of solid)
Water: 57 kg Carry out the process in steps from (i) to (ii) of the aforementioned method to create geopolymer mortar. Load this mortar into a cube mold with dimension of 150 mm. This concrete block is put in steam curing at 100° C. for one hour and dried in microwave oven for 5 minutes, after which it is put into test and obtains the compressive intensity of 55 MPa. Release the product and put it into the crushing machine to create artificial stones with dimension of 10×20 mm to 30×40 mm or artificial sand with bead dimension of 1 to 3 mm. This method can produce 1000 kg of artificial sand or stone.

Example 4: Production of Artificial Sand and Stone with Extrusion Method

The procedure is carried out as described in Example 3 but the water amount is 107 kg until the geopolymer mortar is created. Load this mortar into screw extruder which then extrudes fibers with diameter of 50 mm, which are put on conveyor belt through microwave dryer with temperature up to 200° C., which are then loaded into crushing machine to create artificial stones with dimension of 10×20 mm to 30×40 mm or artificial sand with bead dimension of 1 to 3 mm. This method can produce 1000 kg of artificial sand or stones.

ADVANTAGEOUS EFFECTS OF THE PRESENT INVENTION

The present invention succeeds in proposing a method for producing construction aggregate which can be used to replace common building sand and stones. This method can be easily applied in the production reality because of its short production cycle, and the aggregate obtained from the method of the present invention can be easily customized to meet the specific application needs from ground filling to production of common building materials and components.

The invention claimed is:

1. A method for producing construction aggregate from fly ash comprises the steps of:
   (i) preparing materials, which comprises (% by weight): fly ash (80 to 99.75%); alkaline activator (0.25 to 20%); water (6 to 30% of total weight of fly ash and alkaline activator);
   (ii) mixing the alkaline activator with all the aforementioned water amount to create alkaline activator solution, after which will be mixed with fly ash to create geopolymer mortar;
   (iii) molding the geopolymer mortar with a compressive force of at least 2 MPa with desired dimension, wherein the molding is carried out with hydraulic pressing, extrusion, rolling or tablet lamination;
   (iv) solidify by:
      optionally, steam curing up to 100° C. or autoclaving; drying at the temperature of 60 to 250° C.; to obtain construction aggregate from fly ash; and
   (v) optionally, crushing the construction aggregate obtained above to a predefined dimension.

2. The method for producing construction aggregate from fly ash according to claim 1, wherein the alkaline activator is selected from the group consisting of sodium hydroxide, potassium hydroxide, potassium silicate, sodium silicate, molten glass, calcium hydroxide or mixture of them.

3. The method for producing construction aggregate from fly ash according to claim 1, wherein the solidification in step (iv) is carried out by:
   steam curing up to 100° C.; and
   drying at the temperature of 60 to 250° C.

4. The method for producing construction aggregate from fly ash according to claim 1, wherein the drying is carried out by infrared cure oven, resistance oven or microwave oven.

5. The method for producing construction aggregate from fly ash according to claim 1, wherein the alkaline activator is mixed from sodium hydroxide and molten glass, of which mass fraction of sodium hydroxide and molten glass (dry weight based) ranges from 10/1 to 1/10.

6. The method for producing construction aggregate from fly ash according to claim 2, wherein the solidification in step (iv) is carried out by:
steam curing up to 100° C.; and
drying at the temperature of 60 to 250° C.

7. The method for producing construction aggregate from fly ash according to claim 2, wherein the drying is carried out by infrared cure oven, resistance oven or microwave oven.

8. The method for producing construction aggregate from fly ash according to claim 3, wherein the drying is carried out by infrared cure oven, resistance oven or microwave oven.

9. The method for producing construction aggregate from fly ash according to claim 2, wherein the alkaline activator is mixed from sodium hydroxide and molten glass, of which mass fraction of sodium hydroxide and molten glass (dry weight based) ranges from 10/1 to 1/10.

10. The method for producing construction aggregate from fly ash according to claim 3, wherein the alkaline activator is mixed from sodium hydroxide and molten glass, of which mass fraction of sodium hydroxide and molten glass (dry weight based) ranges from 10/1 to 1/10.

11. The method for producing construction aggregate from fly ash according to claim 4, wherein the alkaline activator is mixed from sodium hydroxide and molten glass, of which mass fraction of sodium hydroxide and molten glass (dry weight based) ranges from 10/1 to 1/10.

12. The method for producing construction aggregate from fly ash according to claim 7, wherein the drying is carried out by infrared cure oven, resistance oven or microwave oven.

13. The method for producing construction aggregate from fly ash according to claim 7, wherein the alkaline activator is mixed from sodium hydroxide and molten glass, of which mass fraction of sodium hydroxide and molten glass (dry weight based) ranges from 10/1 to 1/10.

14. The method for producing construction aggregate from fly ash according to claim 8, wherein the alkaline activator is mixed from sodium hydroxide and molten glass, of which mass fraction of sodium hydroxide and molten glass (dry weight based) ranges from 10/1 to 1/10.

15. The method for producing construction aggregate from fly ash according to claim 9, wherein the alkaline activator is mixed from sodium hydroxide and molten glass, of which mass fraction of sodium hydroxide and molten glass (dry weight based) ranges from 10/1 to 1/10.

\* \* \* \* \*